(12) United States Patent
Nagata (10) Patent No.: US 11,090,587 B2
(45) Date of Patent: Aug. 17, 2021

(54) FLUID SYNTHESIS MONITORING SYSTEM

(71) Applicant: NIKON CORPORATION, Tokyo (JP)

(72) Inventor: Takashi Nagata, Castro Valley, CA (US)

(73) Assignee: NIKON CORPORATION

( * ) Notice: Subject to any disclaimer, the term of this patent is extended or adjusted under 35 U.S.C. 154(b) by 0 days.

(21) Appl. No.: 16/480,592

(22) PCT Filed: Feb. 8, 2018

(86) PCT No.: PCT/US2018/017482
§ 371 (c)(1),
(2) Date: Jul. 24, 2019

(87) PCT Pub. No.: WO2018/148452
PCT Pub. Date: Aug. 16, 2018

(65) Prior Publication Data
US 2019/0388812 A1 Dec. 26, 2019

Related U.S. Application Data (60) Provisional application No. 62/457,632, filed on Feb. 10, 2017.

(51) Int. Cl.
| | |
|---|---|
| *B01D 35/143* | (2006.01) |
| *B01D 37/04* | (2006.01) |
| *F15B 19/00* | (2006.01) |
| *F15B 21/041* | (2019.01) |
| *B24C 7/00* | (2006.01) |

(52) U.S. Cl.
CPC ......... *B01D 35/143* (2013.01); *B01D 37/043* (2013.01); *B01D 37/046* (2013.01); *F15B 19/005* (2013.01); *F15B 21/041* (2013.01); *B24C 7/0007* (2013.01); *F15B 2211/615* (2013.01); *F15B 2211/634* (2013.01); *F15B 2211/6306* (2013.01); *F15B 2211/857* (2013.01)

(58) Field of Classification Search
None
See application file for complete search history.

(56) References Cited

U.S. PATENT DOCUMENTS

| | | |
|---|---|---|
| 2004/0188331 A1 | 9/2004 | Moscaritolo |
| 2005/0103721 A1 | 5/2005 | Fritze |

(Continued)

OTHER PUBLICATIONS

International Search Report and Written Opinion of the International Search Authority for PCT/US18/017482, Nikon Corporation, dated Apr. 24, 2018.

*Primary Examiner* — Richard C Gurtowski
(74) *Attorney, Agent, or Firm* — Roeder & Broder LLP; Steven G. Roeder (57) ABSTRACT

A system (10) for moving a fluid (12) includes a flow-circuit element (30) and a control system (32) that monitors an operational condition of the flow-circuit element (30). The control system (32) includes a first sensor (82) that monitors a first sensed condition, and a second sensor (84) that monitors a second sensed condition that is different from the first sensed condition. Further, the control system (32) includes a processor (76) that analyzes the first sensed condition and the second sensed condition to monitor the operational condition of the flow-circuit element (30).

12 Claims, 5 Drawing Sheets

(56) References Cited

U.S. PATENT DOCUMENTS

| | | | |
|---|---|---|---|
| 2009/0194485 A1* | 8/2009 | Colotte | B01D 35/143 |
| | | | 210/741 |
| 2014/0195172 A1* | 7/2014 | Le | G06F 17/00 |
| | | | 702/47 |
| 2015/0075292 A1 | 3/2015 | Lee | |
| 2016/0077531 A1 | 3/2016 | Kucera et al. | |

* cited by examiner

FLUID SYNTHESIS MONITORING SYSTEM

RELATED APPLICATION

This application claims priority on U.S. Provisional Application Ser. No. 62/457,632 filed on Feb. 10, 2017 and entitled "FLUID SYNTHESIS MONITORING SYSTEM". As far as permitted, the contents of U.S. Provisional Application Ser. No. 62/457,632 is incorporated herein by reference.

BACKGROUND

Manufacturing fluids, such as abrasive particle suspensions, are used in many manufacturing processes. For example, abrasive particle suspensions can be used to polish a workpiece, such as a lens. The abrasive particle suspension is typically an aqueous solution that carries a high concentration of nanoscale abrasive particles. The abrasive particle suspension can play a number of critical roles in the polishing of the workpiece. For example, the chemical composition of the abrasive particle suspension can alter the surface properties of the workpiece, soften the workpiece surface and make it amenable to material removal. Further, the abrasive particles in the abrasive particle suspension remove material from the workpiece surface by cutting nanoscale grooves in the workpiece surface. As a result thereof, the composition of the abrasive particle suspension can significantly influence the quality of the polishing of the workpiece.

Accordingly, there is a never ending search to improve the quality of the abrasive particle suspension. Further, there is a never ending search to reduce the cost of manufacturing the abrasive particle suspension.

SUMMARY

The present invention is directed to a system for manufacturing and/or transferring a fluid. The system can include a flow-circuit element and a control system that monitors an operational condition of the flow-circuit element. At least a portion of the fluid flows through the flow-circuit element. The control system includes a first sensor that monitors a first sensed condition, and a second sensor that monitors a second sensed condition that is different from the first sensed condition. Further, the control system includes a processor that analyzes the first sensed condition and the second sensed condition to monitor the operational condition of the flow-circuit element.

For example, the flow-circuit element can be a filter assembly that includes a filter that filters the fluid, and the control system can monitor the operational condition of the filter. In one embodiment, the control system monitors a flow resistance index for the filter assembly to monitor the operational condition of the filter assembly. For example, the flow resistance index can be based on the relationship between the first sensed condition and the second sensed condition. More specifically, the flow resistance index can be based on the first sensed condition divided by the second sensed condition.

Further, the first sensed condition can be a differential pressure across the filter assembly, and the second sensed condition can be a flow rate of the fluid through the filter assembly. In this embodiment, the flow resistance index can be based on the relationship between the differential pressure across the filter assembly and the flow rate of the fluid through the filter assembly. More specifically, the flow resistance index can be based on the differential pressure across the filter assembly divided by the flow rate of the fluid through the filter assembly.

Alternatively, the flow-circuit element can be an adjustable valve, and the control system monitors the operational condition of the valve. In this embodiment, the first sensed condition can be a differential pressure across the valve, and the second sensed condition can be a flow rate of the fluid through the valve.

The present invention is also directed to a method for monitoring an operational condition of a flow-circuit element that carries a fluid. The method can include monitoring the operational condition of the flow-circuit element with a control system that includes a first sensor that monitors a first sensed condition, and a second sensor that monitors a second sensed condition that is different from the first sensed condition. In this embodiment, the control system includes a processor that analyzes the first sensed condition and the second sensed condition to monitor the operational condition of the flow-circuit element.

The present invention is also directed to a manufacturing system that includes the flow system.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
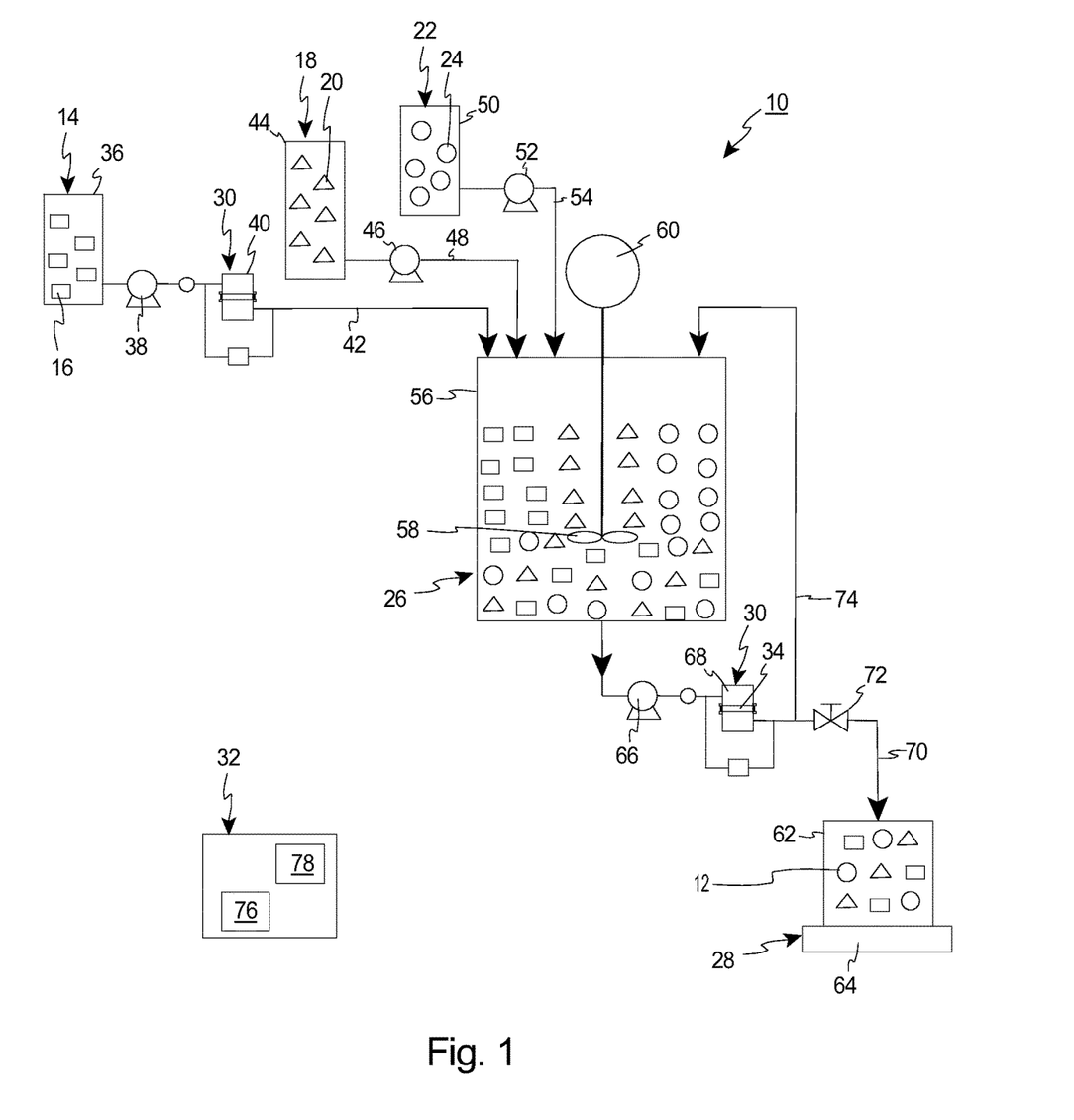
FIG. 1 is a simplified illustration of a fluid system having features of the present invention.

FIG. 1 is a simplified illustration of a fluid system 10 for manufacturing and/or transferring a fluid 12 (illustrated as a combination of small triangles, squares, and circles). The design of the fluid system 10 can be varied to suit the type of fluid 12 that is being manufactured or transferred. In one, non-exclusive embodiment, the fluid 12 is an abrasive particle suspension that is used in a polishing or manufacturing process. In this embodiment, the fluid system 10 is designed to make the abrasive particle suspension, and includes a particle source 14 of particles 16 (illustrated as small squares), a chemical source 18 of one or more chemicals 20 (illustrated as small triangles), a liquid source 22 of one or more liquids 24 (illustrated as small circles), a blending tank assembly 26, a packaging assembly 28, one or more flow-circuit elements 30 (two are illustrated in FIG. 1), and a control system 32. Alternatively, the fluid system 10 can include more or fewer components than illustrated in FIG. 1.

As an overview, the control system 32 is uniquely designed to accurately monitor an operational condition (also referred to as a "health parameter") of the one or more flow-circuit elements 30. As a result thereof, the control system 32 can accurately identify if the one or more flow-circuit elements 30 is functioning properly. As a non-exclusive example, the flow-circuit element 30 can be a filter assembly that includes a removable filter 34. In this embodiment, the operational condition is the status of the filter 34, and the control system 32 can accurately monitor when the filter 34 requires replacement. As a result thereof, the filter 34 can be replaced only when necessary, and the fluid 12 is accurately filtered. This will reduce the manufacturing costs for the fluid 12, while maintaining the integrity of the fluid 12.

The type of fluid 12 can vary. As provided above, the fluid 12 can be an abrasive particle suspension that is used in the polishing of a workpiece, such as a lens. In this embodiment, the fluid system 10 combines the particles 16, the chemicals 20, and the liquid 24 in the blending tank assembly 26 to create the abrasive particle suspension 12 that is an aqueous solution that carries a high concentration of nanoscale abrasive particles 16. The abrasive particle suspension 12 can play a number of critical roles in the polishing of the workpiece. For example, the chemical composition of the abrasive particle suspension 12 can alter the surface properties of the workpiece, soften the workpiece surface and make it amenable to material removal. Further, the abrasive particles 16 in the abrasive particle suspension 12 remove material from the workpiece surface by cutting nanoscale grooves in the workpiece surface. As a result thereof, the composition of the abrasive particle suspension 12 can significantly influence the quality of the polishing of the workpiece.

The particle source 14 provides the particles 16 that are used to make the fluid 12. The type of particles 16 used can be varied to suit the design requirements of the fluid 12. In certain embodiments, the particles 16 should have a size that is less than a predetermined maximum particle size because larger particles 16 will adversely influence the subsequent polishing of the workpiece. In alternative, non-exclusive examples, it is desired to have an abrasive particle suspension 12 that includes particles 16 having a predetermined maximum particle size (diameter) of less than approximately 100, 200, 500, 700, or 1000 nanometers.

In one embodiment, the particle source 14 includes a particle container 36 that retains the particles 16, a particle pump 38, a particle filter assembly 40, and a particle conduit assembly 42. In this embodiment, the particle pump 38 (e.g. a fluid pump) moves the particles 16 from the particle container 36 through the particle filter assembly 40 to the blending tank assembly 26 using the particle conduit assembly 42. In this embodiment, the particle filter assembly 40 can filter out particles 16 that are larger than the predetermined maximum particle size.

The chemical source 18 provides one or more chemicals 20. The type of chemicals 20 used can be varied to suit the design requirements of the fluid 12. In one embodiment, the chemical source 18 can include a chemical container 44 that retains the chemicals 20, a chemical pump 46, and a chemical conduit assembly 48. In this embodiment, the chemical pump 46 (e.g. a fluid pump) moves the chemicals 20 from the chemical container 44 to the blending tank assembly 26 using the chemical conduit assembly 48.

The liquid source 22 provides one or more liquids 24. The type of liquid 24 used can be varied to suit the design requirements of the fluid 12. For example, the liquid 24 can be deionized water or another type of liquid. In one embodiment, the liquid source 18 can include a liquid container 50 that retains the liquid 24, a liquid pump 52, and a liquid conduit assembly 54. In this embodiment, the liquid pump 52 (e.g. a fluid pump) moves the liquids from the liquid container 50 to the blending tank assembly 26 using the liquid conduit assembly 54.

The blending tank assembly 26 receives and mixes the particles 16, chemicals 20, and the liquid 24. In one, non-exclusive embodiment, the blending tank assembly 26 includes a blending tank 56, a blending paddle 58, and a blending motor 60 that moves (e.g. rotates) the blending paddle 58 to mix the particles 16, chemicals 20, and the liquid 24.

The packaging assembly 28 is used for packing the fluid 12. In one embodiment, the packaging assembly 28 includes one or more packages 62 (only one is illustrated in FIG. 1), a package holder 64, a filtration pump 66, a filtration filter assembly 68, and a filtration conduit assembly 70. The packages 62 retain the combined fluid 12 and the package holder 64 retains the one or more packages 62 for filling. The filtration pump 66 (e.g. a fluid pump) moves the fluid 12 from the blending tank 56 through the filtration filter assembly 68 to the packages 62 using the filtration conduit assembly 70. In this embodiment, the filtration filter assembly 68 can filter out particles 16 that are larger than the predetermined maximum particle size.

Moreover, in this embodiment, the packaging assembly 28 can include an adjustable package valve 72 that can be controlled to selectively fill the packages 62, and a fluid return loop 74 that returns the fluid 12 to the blending tank 56 when the package valve 72 is closed or partly closed. This will allow for the filtration pump 66 to continue to operate even when the package 62 is not being filled.

As provided above, the fluid system 10 includes one or more flow-circuit elements 30. As used herein, the term flow-circuit element shall mean and include a filter for particle removal. In FIG. 1, the fluid system 10 includes two flow-circuit elements 30, namely the particle filter assembly 40 and the filtration filter assembly 68. Alternatively, the fluid system 10 can be designed to include one, or more than two flow-circuit elements 30. Further, one or more of the flow-circuit elements 30 can be different than a filter assembly. As another, non-exclusive example, one or more of the flow-circuit elements 30 can include a valve (e.g. an electrical or manually operated valve).

The control system 32 controls the operation of the various components of the fluid system 10. Additionally, as provided herein, the control system 32 can actively monitor the health of the one or more flow-circuit elements 30. In one embodiment, the control system 32 can include one or more processors 76 (illustrated as a box) and electronic data storage 78 (illustrated as a box). The control system 32 can use one or more algorithms to perform the steps provided herein.

Figure 2:
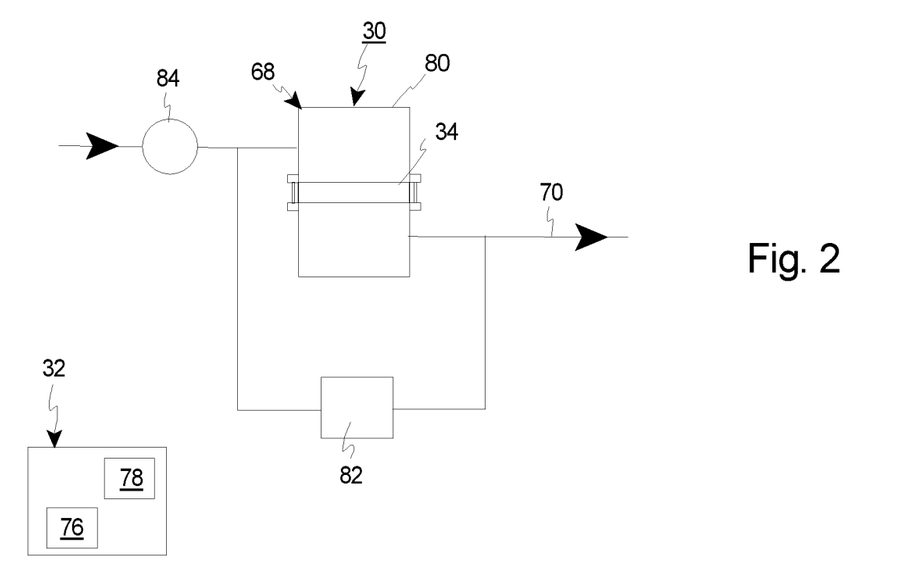
FIG. 2 is a simplified illustration of a portion for the fluid system of FIG. 1.

FIG. 2 is a simplified illustration of a portion for the fluid system 10 of FIG. 1, including the filtration filter assembly 68 (flow-circuit element 30), a portion of the filtration conduit assembly 70, and the control system 32 including the processor 76 and the data storage 78. In this embodiment, the filtration filter assembly 68 includes a filter housing 80, and the removable filter 34. In this embodiment, the fluid 12 (illustrated in FIG. 1) flows through the filter 34 to filter the particles 16 that are larger than the predetermined maximum particle size.

In this embodiment, the control system 32 functions as a monitoring system that monitors the operational condition of the filter 34. In one embodiment, for each flow-circuit element 30, the control system 32 includes a first sensor 82 that monitors a first sensed condition near the respective flow-circuit element 30, and a second sensor 84 that monitors a second sensed condition near the respective flow-circuit element 30. In this embodiment, the first sensor 82 is different from the second sensor 84, and the first sensed condition is different from the second sensed condition. With this design, the control system 32 analyzes the first sensed condition and the second sensed condition to monitor the operational condition of the first flow-circuit element 30.

In one, non-exclusive embodiment, (i) the first sensor 82 is a pressure differential sensor that measures a pressure differential ($\Delta P_{filt}$) between an inlet and an outlet of the flow-circuit element 30 (pressure differential across the filter assembly); and (ii) the second sensor 84 is a flow rate sensor that measures a fluid flow rate ($f_{filt}$) of the fluid 12 through the flow-circuit element 30. In this embodiment, the first sensed condition is the differential pressure across the filter assembly 68, and the second sensed condition is a flow rate of the fluid 12 through the filter assembly 68.

In one embodiment, the control system 32 monitors a flow resistance index ($R_{filt}$) for the filter assembly 68 to monitor the operational condition of the filter assembly 68. In this embodiment, the flow resistance index can be based on the relationship between the first sensed condition (differential pressure across the filter assembly) and the second sensed condition (fluid flow rate through the filter assembly). For example, as provided below in Equation 1, the flow resistance index can be based on the first sensed condition (differential pressure across the filter assembly) divided by the second sensed condition (fluid flow rate through the filter assembly):

$$R_{filt} = \frac{\Delta P_{filt}}{f_{filt}^{\alpha}}. \qquad \text{Equation 1}$$

In Equation 1 and elsewhere, alpha a is an index parameter that can be adjusted to suit the design of the flow-circuit element 30. In Equation 1, the flow resistance index is based on the differential pressure across the filter assembly divided by a value raised to the power of an index parameter where the said value is the flow rate of the fluid through the filter assembly. As non-exclusive examples, the index parameter can have a value of between one and two ($1 \leq \alpha \leq 2$). For example, the index parameter can have a value of one for Poiseuille flow, and a value of two for Bernoulli flow. Thus, as alternative, non-exclusive examples, the index parameter can be 1, 1.1, 1.2, 1.3, 1.4, 1.5, 1.6, 1.7, 1.8, 1.9, or 2. However, index parameter can have a value that is less than one or greater than two.

It should be noted that the control system 32 can continuously monitor the sensor conditions, and the flow resistance index to continuously monitor the health of the flow-circuit element 30. Alternatively, the control system 32 can monitor the sensor conditions, and the flow resistance index at predetermined time intervals.

As provided herein, because the control system 32 actively monitors the two sensor conditions and flow resistance index, the control system 32 can accurately and dynamically determine when the filter 34 requires replacement. For example, when the flow-circuit element 30 is a particle filter 34, the control system 32 can accurately monitor the health of particle filters 34 which are vital to quality control of abrasive particle suspension manufacturing. As a result thereof, the filter 34 can be replaced only when necessary, and the fluid 12 is accurately filtered. Stated in another fashion, with this design, the control system 32 can identify the exact time when the filter 34 needs replacement without influencing the quality of the fluid 12. This can increase the intervals between filter replacements, reduce the manufacturing costs for the fluid 12, while maintaining the integrity of the fluid 12.

Stated in another fashion, to help optimize fluid synthesis in a manufacturing line where vital flow-circuit elements (particle filters) have to be monitored, the invention provides a framework that can determine for each of the vital flow-circuit elements its proper characteristics (filter health parameter) to know the exact timing to replace each flow-circuit element without affecting the quality of the final product fluid. To realize this function, the invention provides a modeling framework that can accurately describe actual fluid-mechanical relationships for each of the vital flow-circuit elements. The key to better modeling is how to describe the relationships between fundamental physical variables at each flow-circuit element (fluid flow rate through filter and differential pressure across filter) so that the model covers a variety of fluid flow types.

In contrast, conventional abrasive particle suspension manufacturing systems (not shown) typically have often limited monitoring capabilities of filters such as fluid pressures sensing only. Thus, the conventional method is not capable of accurately monitoring the health of particle filters which are vital to quality control of abrasive particle suspension manufacturing. This is because sole sensing of fluid pressures as in conventional practice gives indeterminate views of filtration since such pressures are easily affected by causes other than the filters' condition changes. The lack of good filter life monitoring results in either overusing filters beyond their lifespan causing quality deterioration in the final product particle suspension, or replacing the filters prematurely before their proper end of life causing increased manufacturing costs.

Figure 3:
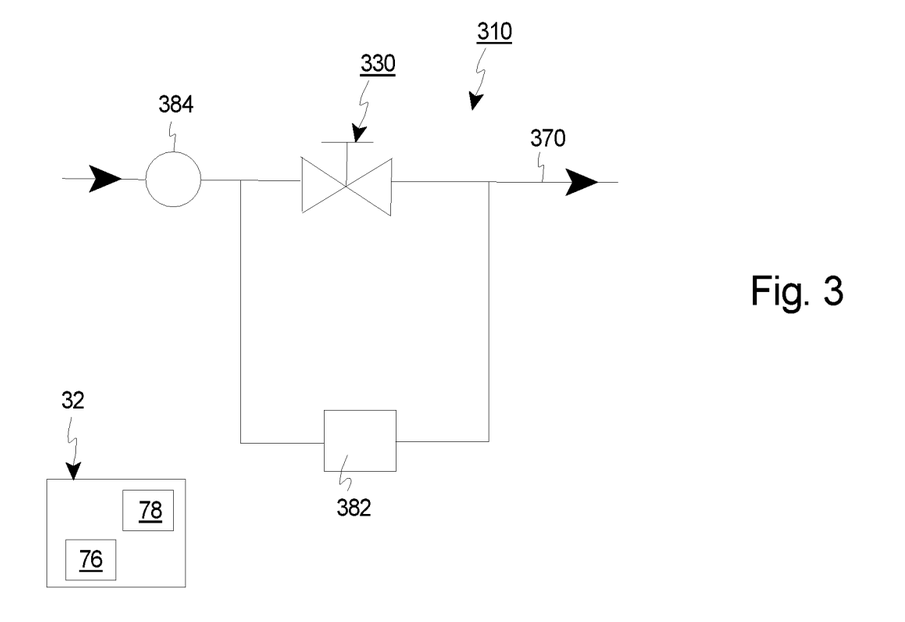
FIG. 3 is a simplified illustration of a portion another embodiment of a fluid system.

FIG. 3 is a simplified illustration of a portion for another fluid system 310 of FIG. 1, including the control system 32 with the processor 76 and the data storage 78, the conduit assembly 370, the first sensor 382, and the second sensor 384 that are similar to the corresponding components described above and illustrated in FIG. 2. However, in this embodiment, the flow-circuit element 330 is an adjustable fluid valve that can be used to selectively control fluid flow in the conduit assembly 370. The fluid valve 330 can be a manual valve or a valve that is controlled by an actuator.

In FIG. 3, the control system 32 functions as a monitoring system that monitors the operational condition of the valve 330 to make sure that the valve 330 is operating correctly and is not getting blocked. In this embodiment, for the valve 330, the control system 32 includes the first sensor 382 that monitors the first sensed condition near the valve 330, and the second sensor 384 that monitors the second sensed condition near the valve 330. The sensors 382, 382 and the sensed conditions can be similar to that described above in reference to FIG. 2. Further, the control system 32 can calculate and utilize the flow resistance index as described above to monitor the health of the valve 330.

Figure 4A:
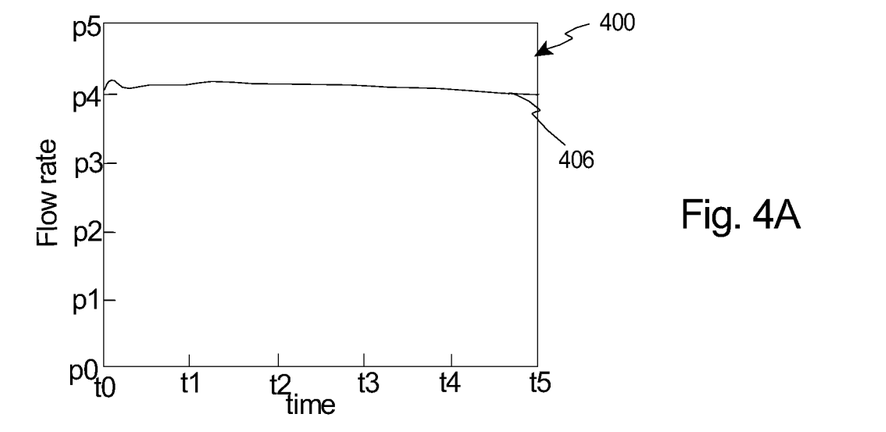
FIG. 4A is a graph that illustrates flow rate through a flow-circuit element versus time.

FIG. 4A is a graph 400 that includes line 401 that illustrates a non-exclusive example of how flow rate through a flow-circuit element, e.g. a filter, can vary over time. In this example, the flow rate 401 can be the second sensed condition for the flow-circuit element.

Figure 4B:
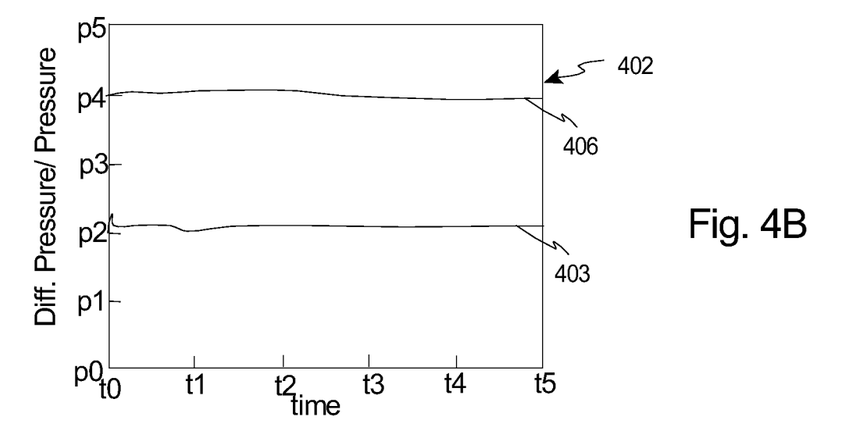
FIG. 4B is a graph that illustrates pressure at a pump outlet and differential pressure across the flow-circuit element versus time.

FIG. 4B is a graph that includes (i) line 406 that illustrates a non-exclusive example of how pressure 406 at a pump outlet (near the flow-circuit element) can vary over time, and (ii) line 403 that illustrates a non-exclusive example of how differential pressure across the flow-circuit element, e.g. the filter, can vary over time. In this example, the differential pressure 403 can be the first sensed condition for the flow-circuit element. Alternatively, the pressure 406 can be the first sensed condition or the second sensed condition for the flow-circuit element.

Figure 4C:
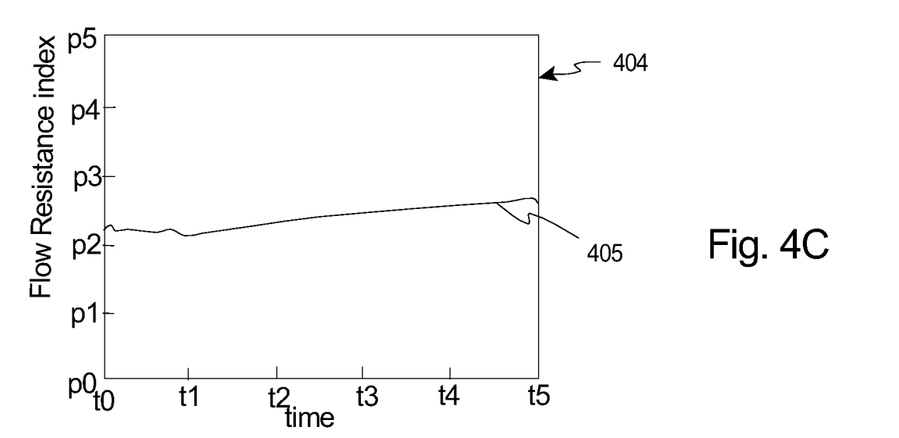
FIG. 4C is a graph that illustrates how a flow resistance index varies over time for a flow-circuit element.

FIG. 4C is a graph that includes line 405 that illustrates a non-exclusive example of how a flow resistance index varies over time for the flow-circuit element.

As illustrated in FIGS. 4A and 4B, there are very little changes in fluid flow rate 401, differential pressure 403, and pressure 406 versus time. Thus, these sensed conditions by themselves are not very effective in indicating the health of the flow-circuit element. In contrast, as illustrated in FIG. 4C, the flow resistance index 405 shows slow, but steady change versus time after time t1. Thus, the flow resistance index 405 can be used to indicate the health of the flow-circuit element with improved signal integrity than solely relying on direct measurements such as differential pressure 403 and pressure 406.

In one non-exclusive embodiment, the control system can provide a notification (e.g. a red light, a buzzer, via e-mail, or other method) when the flow resistance index 405 reaches a predetermined maximum index value that maintenance is necessary for the flow-circuit element (e.g., the filter health is bad and the filter needs replacement, or the valve is plugged and needs cleaning). The actual number used for the predetermined maximum index value can vary on a case-by-case basis, and will also vary based on the sensed conditions used for the flow resistance index 405.

Alternatively, the control system can use the flow resistance index 405 to continuously provide information regarding the status of the flow-circuit element (e.g. 25, 30, 50, 75, 80, 90 percent plugged).

Figure 5A:
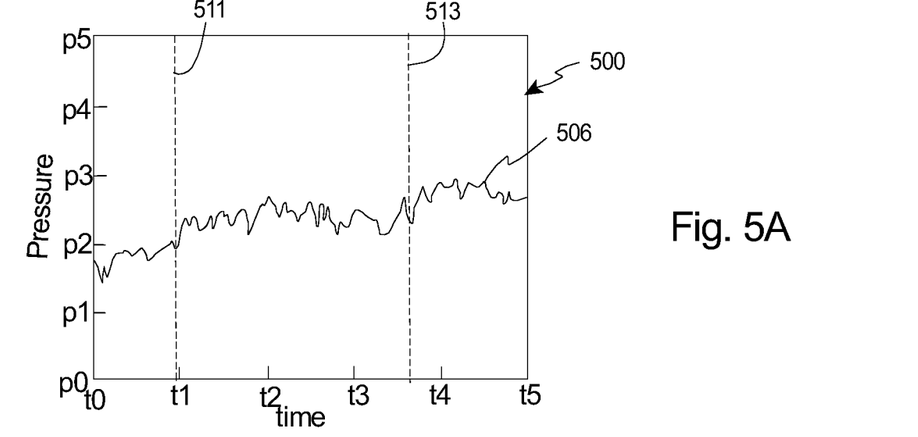
FIG. 5A is a graph that illustrates outlet pressure versus time at a pump outlet near a flow-circuit element.

FIG. 5A is a graph 500 that includes line 506 that illustrates another non-exclusive example of pressure at pump outlet positioned near a flow-circuit element, e.g. a filter, can vary over time.

Figure 5B:
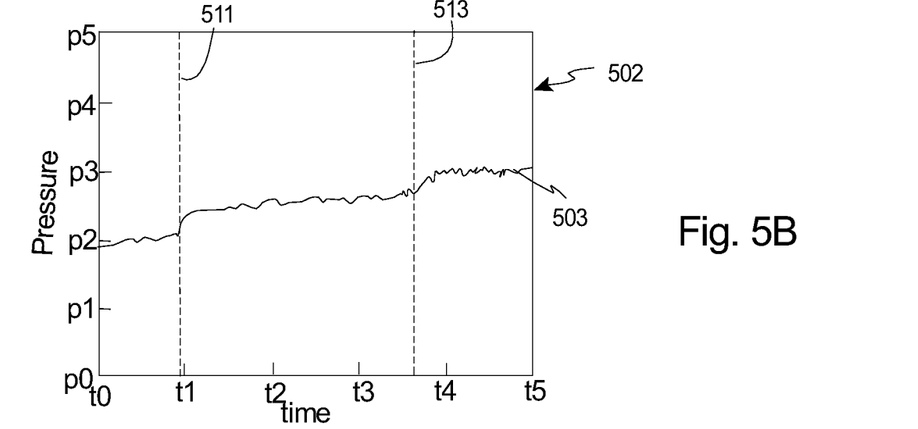
FIG. 5B is a graph that illustrates differential pressure versus time across the flow-circuit element.

FIG. 5B is a graph that includes line 503 that illustrates a non-exclusive example of how differential pressure across the flow-circuit element, e.g. the filter, can vary over time. In this example, the differential pressure 503 can be the first sensed condition for the flow-circuit element, and flow rate through the flow-circuit element can be the second sensed condition of the flow-circuit element. Alternatively, the pressure 506 can be the first sensed condition or the second sensed condition for the flow-circuit element.

Figure 5C:
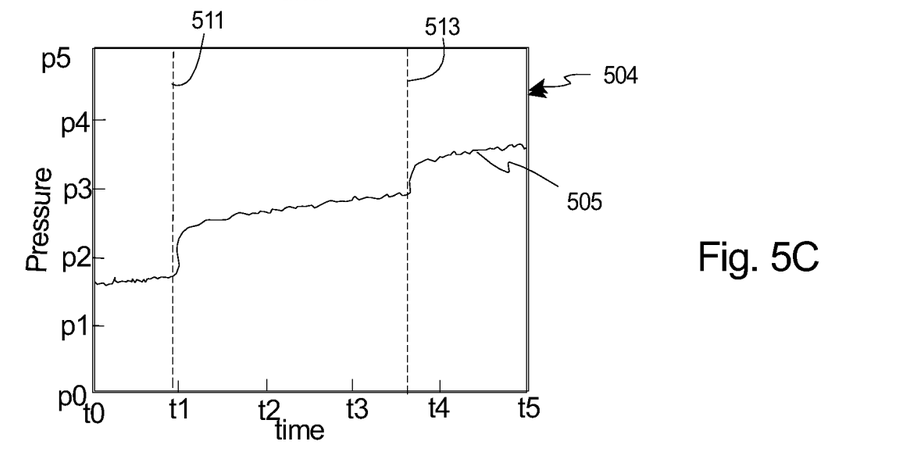
FIG. 5C is a graph that illustrates how a flow resistance index varies over time for the flow-circuit element.

FIG. 5C is a graph 504 that includes line 505 that illustrates a non-exclusive example of how a flow resistance index (operational condition) varies over time for the flow-circuit element.

It should be noted that (i) at little before time t1 (illustrated as dashed line 511 in FIGS. 5A-5C) a gallon of particles were added into the fluid that flows through the flow-circuit element, and (ii) at between time t3 and t4 (illustrated as dashed line 513 in FIGS. 5A-5C) another gallon of particles were added into the fluid that flows through the flow-circuit element.

As illustrated in FIGS. 5A and 5B, there are very little changes in differential pressure 503, and pressure 506 versus time even when the additional particles were added. Thus, these sensed conditions by themselves are not very effective in indicating the health of the flow-circuit element. In contrast, as illustrated in FIG. 5C, the flow resistance index 505 shows relatively steep changes (spikes) when the additional particles were added, and relatively steady change versus time. Thus, the flow resistance index 505 can be used to indicate the health of the flow-circuit element with improved signal integrity than solely relying on direct measurements such as differential pressure 503, flow rate, and/or pressure 506. Stated in another fashion, the flow resistance index 505 can be used to indicate the health of the flow-circuit element with respect to both its long-term trends and short-term occurrences with improved signal-to-noise ratio than solely relying on direct measurements such as differential pressure 503 and pressure 506.

Figure 6:
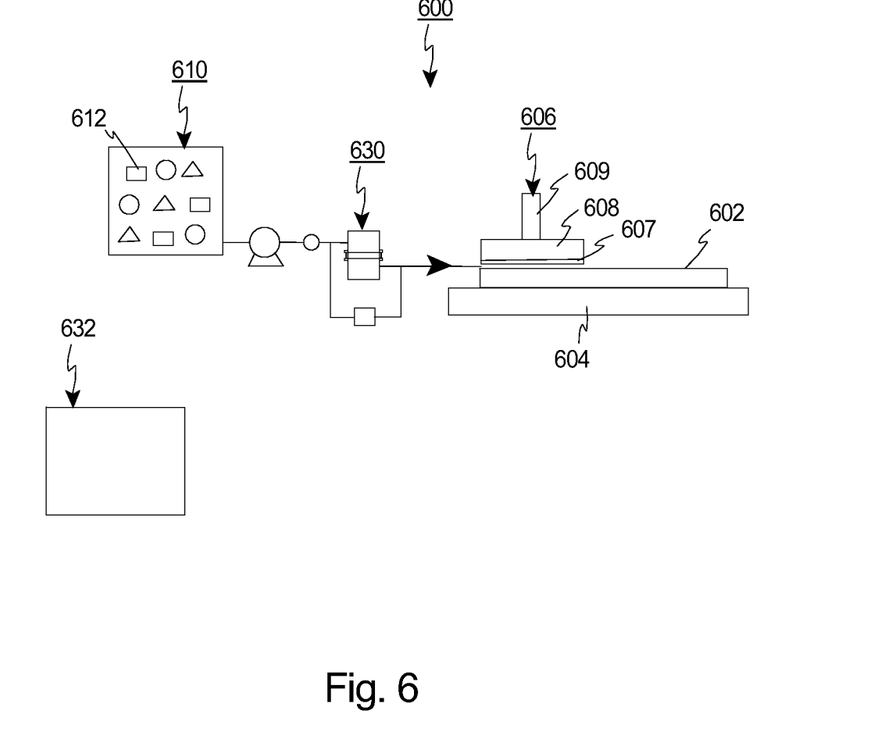
FIG. 6 is a simplified illustration of a portion of yet another embodiment of a fluid system.

FIG. 6 is a simplified illustration of a manufacturing system 600 for a workpiece 602 that includes a fluid system 610, a workpiece holder 604, and a polisher 606. In this embodiment, the manufacturing system 600 can be used to polish the workpiece 602. For example, the workpiece 602 can be a lens.

In one embodiment, the fluid system 610 can be used to pump the fluid 612 into the gap between the polisher 606 and the workpiece 602. Further, the control system 632 can be used to monitor the health of one or more flow-circuit elements 630 of the fluid system 610.

Moreover, the polisher 606 can include a polishing pad 607, a pad holder 608 that retains the pad 607, and pad mover 609 that selectively moves the pad 607 relative to the workpiece 602 to polish the workpiece 602.

While the particular assembly as shown and disclosed herein is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for moving a fluid, the system comprising:
a flow-circuit element, wherein at least a portion of the fluid flows through the flow-circuit element; and
a control system that monitors an operational condition of the flow-circuit element, the control system including a first sensor that monitors a first sensed condition, and a second sensor that monitors a second sensed condition that is different from the first sensed condition, wherein the control system includes a processor that analyzes the first sensed condition and the second sensed condition to monitor the operational condition of the flow-circuit element;
wherein the first sensed condition is a differential pressure across the flow-circuit element and the second sensed condition is a flow rate of the fluid through the flow-circuit element;
wherein the control system monitors a flow resistance index for the flow-circuit element to monitor the operational condition of the flow-circuit element; and
wherein the flow resistance index is based on the relationship between the differential pressure across the flow-circuit element and the flow rate of the fluid through the flow-circuit element.

2. The system of claim 1 wherein the flow-circuit element is a filter assembly that includes a filter that filters the fluid, and wherein the control system monitors an operational condition of the filter.

3. The system of claim 2 wherein the flow resistance index is based on the differential pressure across the flow-circuit element divided by the flow rate of the fluid through the flow-circuit element raised to the power of an index parameter.

4. The system of claim 1 wherein the flow-circuit element is an adjustable valve, and wherein the control system monitors an operational condition of the adjustable valve.

5. The system of claim 1 wherein the flow resistance index is based on the differential pressure across the flow-circuit element divided by the flow rate of the fluid through the flow-circuit element raised to the power of an index parameter.

6. A method for monitoring an operational condition of a flow-circuit element that transmits a fluid, the method comprising:

monitoring the operational condition of the flow-circuit element with a control system that includes a first sensor that monitors a first sensed condition, and a second sensor that monitors a second sensed condition that is different from the first sensed condition, wherein the control system includes a processor that analyzes the first sensed condition and the second sensed condition to monitor the operational condition of the flow-circuit element;

wherein the first sensed condition is a differential pressure across the flow-circuit element and the second sensed condition is a flow rate of the fluid through the flow-circuit element;

wherein the control system monitors a flow resistance index for the flow-circuit element to monitor the operational condition of the flow-circuit element; and wherein the flow resistance index is based on the relationship between the differential pressure across the flow-circuit element and the flow rate of the fluid through the flow-circuit element.

7. The method of claim 6 wherein the flow-circuit element is a filter assembly that includes a filter that filters the fluid, and wherein monitoring includes monitoring an operational condition of the filter.

8. The method of claim 7 wherein the flow resistance index is based on the differential pressure across the flow-circuit element divided by the flow rate of the fluid through the flow-circuit element raised to the power of an index parameter.

9. The method of claim 6 wherein the flow-circuit element is an adjustable valve, and wherein monitoring includes monitoring an operational condition of the adjustable valve with the control system.

10. The method of claim 6 wherein the flow resistance index is based on the differential pressure across the flow-circuit element divided by the flow rate of the fluid through the flow-circuit element raised to the power of an index parameter.

11. The method of claim 9 wherein the flow resistance index is based on the differential pressure across the flow-circuit element divided by the flow rate of the fluid through the flow-circuit element raised to the power of an index parameter.

12. The system of claim 4 wherein the flow resistance index is based on the differential pressure across the flow-circuit element divided by the flow rate of the fluid through the flow-circuit element raised to the power of an index parameter.

* * * * *